United States Patent
Patil et al.

(10) Patent No.: US 11,695,853 B1
(45) Date of Patent: Jul. 4, 2023

(54) CONTENT MANAGEMENT SYSTEMS PROVIDING ZERO RECOVERY POINT OBJECTIVE

(71) Applicant: T-Mobile USA, Inc., Bellevue, WA (US)

(72) Inventors: Vaishali Vijay Patil, Sammamish, WA (US); Seshama Naidu Enaganti, Johns Creek, GA (US); Loganathan Kulanthaisamy, Bothell, WA (US); Ramkishan Sadasivam, Cumming, GA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/715,677

(22) Filed: Apr. 7, 2022

(51) Int. Cl.
*H04L 67/568* (2022.01)
*H04L 67/2895* (2022.01)
*H04L 67/1097* (2022.01)
*G06F 16/182* (2019.01)
*G06F 16/11* (2019.01)

(52) U.S. Cl.
CPC .......... *H04L 67/568* (2022.05); *G06F 16/116* (2019.01); *G06F 16/182* (2019.01); *H04L 67/1097* (2013.01); *H04L 67/2895* (2013.01)

(58) Field of Classification Search
CPC ............... H04L 67/568; H04L 67/1097; H04L 67/2895; G06F 16/182; G06F 16/116
See application file for complete search history.

(56) References Cited

U.S. PATENT DOCUMENTS

| | | | |
|---|---|---|---|
| 4,164,037 A | 8/1979 | Cochran et al. |
| 6,636,941 B1 | 10/2003 | Gold et al. |
| 6,944,154 B2 | 9/2005 | Coupe et al. |
| 7,113,927 B1 | 9/2006 | Tanaka et al. |
| 7,350,038 B2 | 3/2008 | Kikuchi et al. |
| 7,475,246 B1 | 1/2009 | Moskowitz et al. |
| 7,693,746 B2 | 4/2010 | Wachi |
| 7,715,826 B2 | 5/2010 | Barker et al. |
| 7,721,344 B2 | 5/2010 | Redlich et al. |

(Continued)

FOREIGN PATENT DOCUMENTS

| | | |
|---|---|---|
| CN | 102542030 A | 7/2012 |
| CN | 103036933 A | 4/2013 |

(Continued)

*Primary Examiner* — Shean Tokuta
(74) *Attorney, Agent, or Firm* — Perkins Coie LLP (57) ABSTRACT

A server system for managing electronic content receives the electronic content at a data flow adapter. The electronic content is to be stored at a data storage system. The server system attempts to transmit the electronic content from the data flow adapter to the data storage system but receives a notification indicating that the data storage system will not store the electronic content. In response to the notification, the server system temporarily stores the electronic content at a data staging memory. A staging data adapter polls the data staging memory for electronic content awaiting to be stored at the data storage system. The server system detects the electronic content stored at the data staging memory and, in response, causes the staging data adapter to move the electronic content from the data staging memory to the data storage system when the data storage system will store the electronic content.

20 Claims, 4 Drawing Sheets

(56) References Cited

U.S. PATENT DOCUMENTS

| | | | |
|---|---|---|---|
| 7,764,290 | B2 | 7/2010 | Fredlund et al. |
| 8,220,065 | B2 | 7/2012 | Yanase et al. |
| 8,239,627 | B2 | 8/2012 | Maus et al. |
| 8,255,080 | B2 | 8/2012 | Hirsh et al. |
| 8,301,798 | B2 | 10/2012 | Mond et al. |
| 8,307,089 | B1 | 11/2012 | Rothschild |
| 8,555,187 | B2 | 10/2013 | Margolin |
| 8,566,702 | B2 | 10/2013 | Sherkin |
| 8,726,065 | B2 * | 5/2014 | Drucker .................. G06F 11/20 714/4.11 |
| 8,949,438 | B2 | 2/2015 | Penston et al. |
| 8,949,564 | B2 | 2/2015 | Sharp et al. |
| 9,003,464 | B2 | 4/2015 | Ospalik et al. |
| 9,092,292 | B2 | 7/2015 | Matov et al. |
| 9,229,972 | B2 | 1/2016 | Damon et al. |
| 9,298,834 | B2 | 3/2016 | Kleppner et al. |
| 9,307,205 | B2 | 4/2016 | Smoyer et al. |
| 9,369,527 | B2 | 6/2016 | Nishibori et al. |
| 9,646,003 | B2 | 5/2017 | Wolfram |
| 9,742,828 | B2 | 8/2017 | Hagan |
| 9,767,015 | B1 * | 9/2017 | McKelvie ............ G06F 11/1471 |
| 9,773,059 | B2 | 9/2017 | Chakravarty et al. |
| 9,813,096 | B2 | 11/2017 | Ido et al. |
| 9,842,151 | B2 | 12/2017 | Wang et al. |
| 9,875,374 | B2 | 1/2018 | Brownewell et al. |
| 10,158,483 | B1 | 12/2018 | Newman |
| 10,482,426 | B2 | 11/2019 | Valerio et al. |
| 10,523,755 | B1 * | 12/2019 | Quach .................. H04L 67/104 |
| 10,754,901 | B2 | 8/2020 | Iball et al. |
| 10,951,673 | B2 | 3/2021 | Demange et al. |
| 10,997,238 | B2 | 5/2021 | Sagot et al. |
| 11,093,139 | B1 | 8/2021 | Karr et al. |
| 11,126,364 | B2 | 9/2021 | Karr et al. |
| 11,153,628 | B2 * | 10/2021 | Rao .................. H04N 21/43622 |
| 2002/0002510 | A1 | 1/2002 | Sharp et al. |
| 2005/0060578 | A1 | 3/2005 | Xue |
| 2005/0141028 | A1 | 6/2005 | Koppich |
| 2006/0085349 | A1 | 4/2006 | Hug |
| 2008/0044030 | A1 | 2/2008 | Mishra |
| 2008/0056234 | A1 * | 3/2008 | Sprague ............. H04L 65/1045 370/352 |
| 2008/0097846 | A1 | 4/2008 | Oikawa et al. |
| 2009/0177996 | A1 | 7/2009 | Hunt et al. |
| 2009/0257180 | A1 | 10/2009 | Davis et al. |
| 2010/0070796 | A1 * | 3/2010 | Sivaperuman ...... G06F 11/2094 714/5.1 |
| 2010/0125587 | A1 | 5/2010 | Matsui et al. |
| 2010/0161616 | A1 | 6/2010 | Mitchell |
| 2010/0164989 | A1 | 7/2010 | Margalit et al. |
| 2011/0179108 | A1 | 7/2011 | Sorenson et al. |
| 2012/0179583 | A1 | 7/2012 | Jensen et al. |
| 2012/0311289 | A1 | 12/2012 | Meiyappan et al. |
| 2014/0074270 | A1 | 3/2014 | Kubota |
| 2015/0379060 | A1 * | 12/2015 | Levandoski ........ G06F 16/2322 707/607 |
| 2016/0162483 | A1 | 6/2016 | Park et al. |
| 2016/0371677 | A1 | 12/2016 | Kim |
| 2017/0017397 | A1 * | 1/2017 | Morley ................. G06F 3/0647 |
| 2019/0325048 | A1 * | 10/2019 | Watkins ............. G06F 16/2358 |
| 2020/0053189 | A1 * | 2/2020 | Peng ........................ H04L 67/12 |
| 2020/0145193 | A1 | 5/2020 | Chen et al. |
| 2021/0173606 | A1 | 6/2021 | Oosthoek et al. |
| 2022/0021945 | A1 | 1/2022 | Proscia et al. |

FOREIGN PATENT DOCUMENTS

| | | | |
|---|---|---|---|
| CN | 103413257 A | 11/2013 | |
| CN | 103810588 A | 5/2014 | |
| CN | 103903200 A | 7/2014 | |
| CN | 101867613 B | 12/2014 | |
| CN | 104426903 A | 3/2015 | |
| CN | 103218319 B | 1/2016 | |
| CN | 105279173 A | 1/2016 | |
| CN | 1750001 B | 7/2018 | |
| CN | 108763963 A | 11/2018 | |
| CN | 107230032 B | 6/2020 | |
| CN | 110362762 B | 1/2022 | |
| DE | 10024753 B4 | 5/2006 | |
| DE | 202013012493 U1 | 1/2017 | |
| DE | 102019103985 A1 | 8/2020 | |
| EP | 1033665 A2 | 9/2000 | |
| EP | 1903459 B1 | 10/2009 | |
| EP | 1981214 B1 | 3/2010 | |
| EP | 2237170 A1 | 10/2010 | |
| EP | 1776820 B1 * | 6/2011 | ............. H04L 67/02 |
| EP | 2431891 A1 | 3/2012 | |
| JP | 2001189973 A * | 7/2001 | |
| JP | 2004295614 A * | 10/2004 | |
| JP | 4392696 B2 | 10/2009 | |
| JP | 4413352 B2 * | 2/2010 | |
| JP | 2010224583 A | 10/2010 | |
| JP | 5470862 B2 | 2/2014 | |
| JP | 2016071892 A | 5/2016 | |
| KR | 20030047429 A | 6/2003 | |
| KR | 20060062114 A | 6/2006 | |
| TW | I731579 B * | 6/2021 | |
| WO | 0197505 A1 | 12/2001 | |
| WO | 03073298 A1 | 9/2003 | |
| WO | 2004097697 A1 | 11/2004 | |
| WO | 2005124557 A1 | 12/2005 | |
| WO | 2010128529 A1 | 11/2010 | |
| WO | 2012110567 A1 | 8/2012 | |
| WO | 2015193770 A1 | 12/2015 | |
| WO | 2015198362 A1 | 12/2015 | |
| WO | 2015198364 A1 | 12/2015 | |
| WO | 2016110807 A1 | 7/2016 | |
| WO | 2016198635 A1 | 12/2016 | |
| WO | 2021051747 A1 | 3/2021 | |
| WO | 2021058717 A1 | 4/2021 | |
| WO | 2021189283 A1 | 9/2021 | |

* cited by examiner

CONTENT MANAGEMENT SYSTEMS PROVIDING ZERO RECOVERY POINT OBJECTIVE

BACKGROUND

Content management systems include computer software used to manage the generation, modification, and storage of electronic content (e.g., electronic documents). Content management systems can support multiple users or client devices in a collaborative environment by integrating two or more server systems for document management and document retention and retrieval. As an example, content management systems can be used in the management of electronic legal content. Management of electronic legal content requires a higher level of operational stability due to the importance of such content.

Recovery point objective (RPO) refers to the maximum amount of data, as measured by time, that can be lost after recovery from an operational failure or disruption before data loss will exceed what is acceptable to an organization. The disruption can include, for example, an instance where one or more servers or computer systems storing electronic content become non-operational. The RPO required for legal content management systems of businesses is relatively short so that any consequences to the operation of the business and/or its clients can be avoided.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to content management systems having a zero recovery point objective (zero RPO) for storing electronic content during operational disruptions. RPO is a time-based measurement that describes the amount of time that can pass during an interruption before data loss exceeds that tolerance The zero RPO can refer to a reduced or minimal time period during which data is lost due to operational interruptions (e.g., the amount of electronic content lost is zero or almost zero). The disclosed systems are configured to transfer electronic content received from a client application to a data storage system in a manner that ensures that a minimal amount of electronic content is lost when the data storage system is temporarily non-operational. Having zero RPO is desirable, for example, for storing content with high importance such as legal content. For example, wireless service providers are required to store legal documents arising from transactions with clients. Such legal documents can include contract agreements, finance agreements, or lease agreements. Preventing loss of such legal documents due to operational failures can avoid economic loss as well as inconveniences to clients.

In one example, a system includes a server system in communication with a client application and a data storage system (e.g., a system of record). The server system can receive electronic content (e.g., an electronic legal document) from the client application and transmit the electronic content to the data storage system. In an instance that the data storage system is not able or available (e.g., inoperable) to store the electronic content (e.g., the operation of data storage is interrupted), the server system can receive a notification and instead temporarily store the electronic content to a data staging memory. Storing the electronic content temporarily to the data staging memory ensures that minimum or zero electronic content is lost due to interruptions at the data storage system. The data staging memory is configured to store the electronic content until the data storage is available and able to store the electronic content.

In another example, a server system associated with a wireless service provider for the management of content receives electronic content at a data flow adapter of the server system. The electronic content is to be stored at a data storage system. The server system transmits the electronic content from the data flow adapter to the data storage system via a real-time data adapter that is configured to automatically forward the received electronic content from the real-time data adapter to the data storage system. The server system then receives a first notification indicating that the data storage system is unable or unavailable for storing the electronic content. In response to receiving the first notification, the server system temporarily stores the electronic content at a data staging memory of the server system. The electronic content is stored at the data staging memory while the data storage system remains unable or unavailable. The server system causes a staging data adapter of the server system to poll the data staging memory for at least an indication that electronic content is awaiting at the data staging memory to be stored at the data storage system. The server system detects that there is electronic content stored at the data staging memory awaiting to be stored at the data storage system and causes the staging data adapter to move the electronic content from the data staging memory to the data storage system when the data storage system is available and able to store the electronic content.

In another example, a method includes receiving electronic content at a first adapter of a first server system. The electronic content is to be stored at a second server system. The method includes routing the electronic content from the first adapter to a data staging memory and temporarily storing the electronic content at the data staging memory until the second server system becomes ready to store the electronic content. The method includes causing a second data adapter of the first server system to poll the data staging memory for at least an indication that any electronic content is awaiting to be stored at the second server system. The method also includes causing the second data adapter to move the electronic content from the data staging memory to the second server system when the second server system is ready to store the electronic content.

In yet another example, a data ingestor polls, by a staging data adapter of the data ingestor, a data staging memory for at least an indication that any electronic content is awaiting to be stored at a data storage system. The data storage system can be separate and distinct from the data ingestor. The staging data adapter attempts to move the electronic content from the data staging memory to the data storage system. The staging data adaptor can receives a first notification indicating that the data storage system is unable or unavailable for storing the electronic content. In response to the first notification, the data ingestor continues to periodically attempt to move, by the staging data adapter, the electronic content from the data staging memory to the data storage system until the data storage system successfully receives and stores the electronic content. The staging data adapter thus causes the data storage system to store the electronic content when the data storage system is available and able to store the electronic content.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

System Overview

Figure 1:
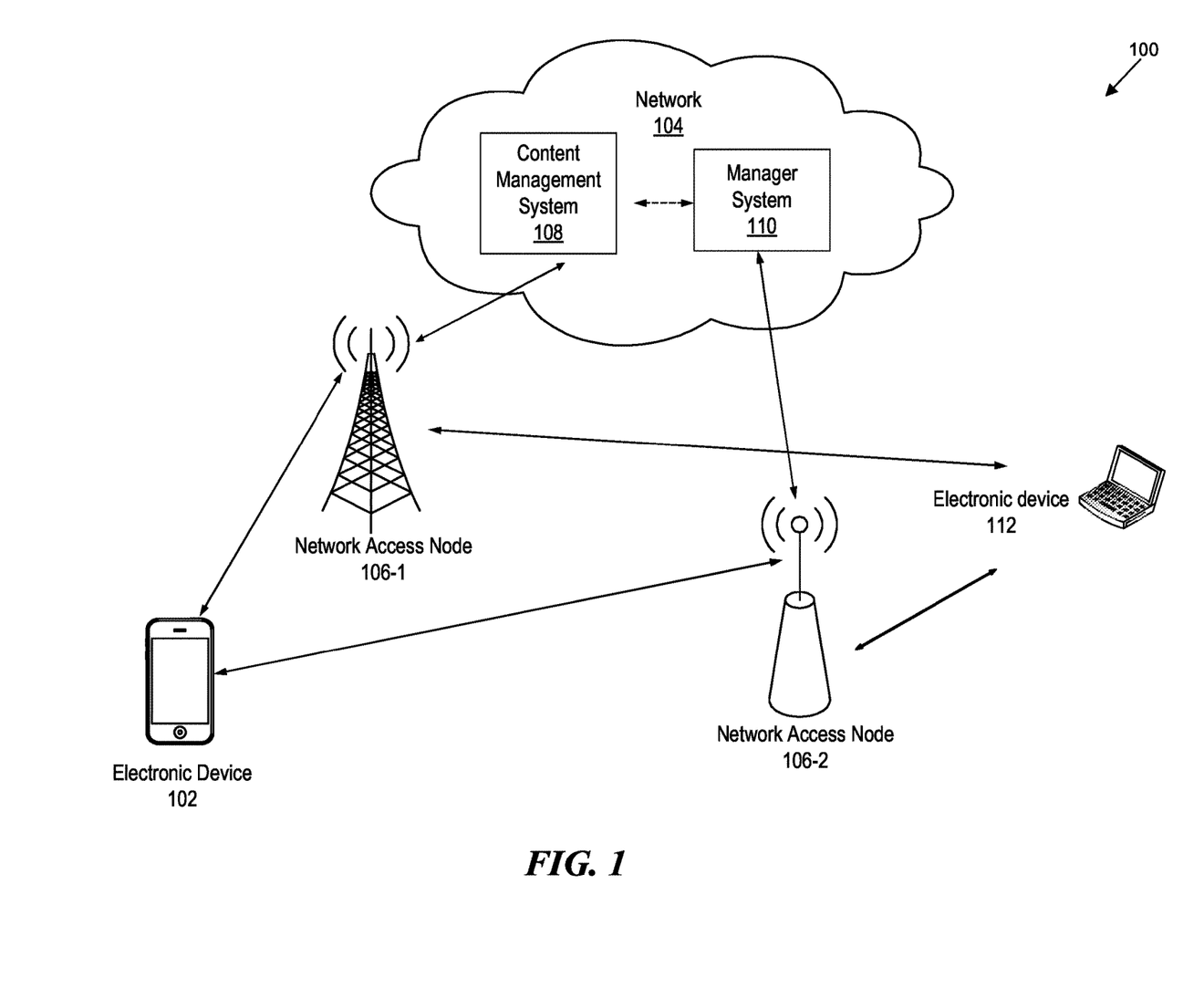
FIG. 1 is a block diagram that illustrates a network system.

FIG. 1 is a block diagram that illustrates a network system 100. The system 100 includes an electronic device 102 that is communicatively coupled to network 104 via network access nodes 106-1 and 106-2 (referred to collectively as "network access nodes 106"). The system 100 also includes an electronic device 112 communicatively coupled to the network 104 via the network access nodes 106.

The electronic devices 102 and 112 can be any type of electronic devices that can communicate with a network node and/or with another electronic device in a cellular, computer, and/or mobile communications system. Examples of such electronic devices include smartphones, tablet computers, laptop computers, wireless devices capable of machine-to-machine (M2M) communication, wearable electronic devices, movable Internet of Things (IoT) devices, and any other handheld device that is capable of accessing the network(s) 104. Although only two electronic devices are illustrated in FIG. 1, the disclosed implementations can include any number of electronic devices.

The electronic devices 102 and 112 can store and transmit (e.g., internally and/or with other electronic devices over a network) signals, code (composed of software instructions), or data by using machine-readable media, such as non-transitory machine-readable media (e.g., machine-readable storage media such as magnetic disks, optical disks, read-only memory (ROM), flash memory devices, and phase change memory) and transitory machine-readable transmission media (e.g., electrical, optical, acoustical, or other forms of propagated signals, such as carrier waves or infrared signals).

The electronic devices 102 and 112 can include hardware such as one or more processors coupled to sensors and a non-transitory machine-readable media to store code and/or sensor data, user input/output (I/O) devices (e.g., a keyboard, a touchscreen, and/or a display), and network connections (e.g., an antenna) to transmit code and/or data using propagating signals. The coupling of the processor(s) and other components is typically through one or more busses and bridges (also referred to as bus controllers). Thus, a non-transitory machine-readable medium of a given electronic device typically stores instructions for execution on a processor(s) of that electronic device. One or more parts of an implementation of the present technology can be implemented using different combinations of software, firmware, and/or hardware.

The network access nodes 106 can be any type of network access node that can communicate with a wired or wireless device (e.g., electronic devices 102 and 112) and/or with another network node. The network access nodes 106 can be a network device or apparatus. Examples of network access nodes include a base station (e.g., network access node 106-1), an access point (e.g., network access node 106-2), or any other type of network node such as a network controller, radio network controller (RNC), base station controller (BSC), a relay, transmission points, and the like.

The system 100 depicts different types of wireless access nodes 106 to illustrate that the electronic device 102 can access different types of networks through different types of network access nodes. For example, a base station (e.g., the network access node 106-1) can provide access to a cellular telecommunications system of the network(s) 104. An access point (e.g., the network access node 106-2) is a transceiver that provides access to a computer system of the network(s) 104.

The network(s) 104 can include any combination of private, public, wired, or wireless systems such as a cellular network, a computer network, the Internet, and the like. Any data communicated over the network(s) 104 can be encrypted or unencrypted at various locations or along different portions of the networks. Examples of wireless systems include Wideband Code Division Multiple Access (WCDMA), High Speed Packet Access (HSPA), Wi-Fi, Wireless Local Area Network (WLAN), and Global System for Mobile Communications (GSM), GSM Enhanced Data Rates for Global Evolution (EDGE) Radio Access Network (GERAN), 4G or 5G wireless wide area networks (WWAN), and other systems that can also benefit from exploiting the scope of this disclosure.

The system 100 further includes a manager server 110 and a content management system 108. The manager server 110 can mediate a flow of data from the electronic devices 102 and 112 to the content management system 108. In some implementations, the manager server 110 can include any number of server computers communicatively coupled to the electronic devices 102 and 112 via the network access nodes 106. The manager server 110 can include combinations of hardware and/or software to process data, perform functions, communicate over the network(s) 104, etc. For example, server computers of the manager server 110 can include a processor, memory or storage, a transceiver, a display, operating system and application software, and the like. Other components, hardware, and/or software included in the system 100 that are well known to persons skilled in the art are not shown or discussed herein for brevity. Moreover, although shown as being included in the network(s) 104, the manager server 110 can be located anywhere in the system 100 to implement the disclosed technology.

The content management system 108 can store data generated by the electronic device 102 and/or electronic device 112 and communicated to the content management system 108 via the manager server 110. The content management system 108 can include one or more network nodes that store data. In a distributed implementation (e.g., blockchain), network nodes of the content management system 108 can each store an identical copy of the data and be updated independently. Although shown in the network(s) 104, content management system 108 can be located anywhere in the network system 100.

In some implementations, the manager server 110 can receive electronic content from the electronic device 102 and/or the electronic device 112 to be stored at the content management system 108. The manager server 110 causes the electronic content to be stored at the content management system 108. The manager server 110 can cause the electronic content to be transmitted to the content management system 108 via various paths. For example, the manager server 110 can cause the electronic content to be transmitted to the content management system 108 in a real-time path or a data staging path. The real-time path is used to transmit the electronic content received from the electronic device 102 and/or the electronic device 112 in real-time or nearly real-time directly to the content management system 108. However, in an instance where the content management system 108 is unable or unavailable to store the electronic content, the data staging path can be used. The data staging path includes storing the electronic content temporarily in a data staging memory until the content management system is available and able to store the electronic content. The various paths for transmitting the electronic content from the manager server 110 to the content management system 108 ensure that minimum or zero electronic content is lost in instances where the operation of the content management system 108 is interrupted.

In one implementation, the manager server 110 is associated with a store providing products or services to be purchased online or at physical stores. For example, a user of the electronic device 102 can do an online purchase or an online service agreement via the electronic device 102. A legal document associated with the online purchase or service agreement can be communicated from the electronic device 102 to the manager server 110 for storing. The manager server 110 can further communicate the legal document to be stored at the content management system 108.

Figure 2:
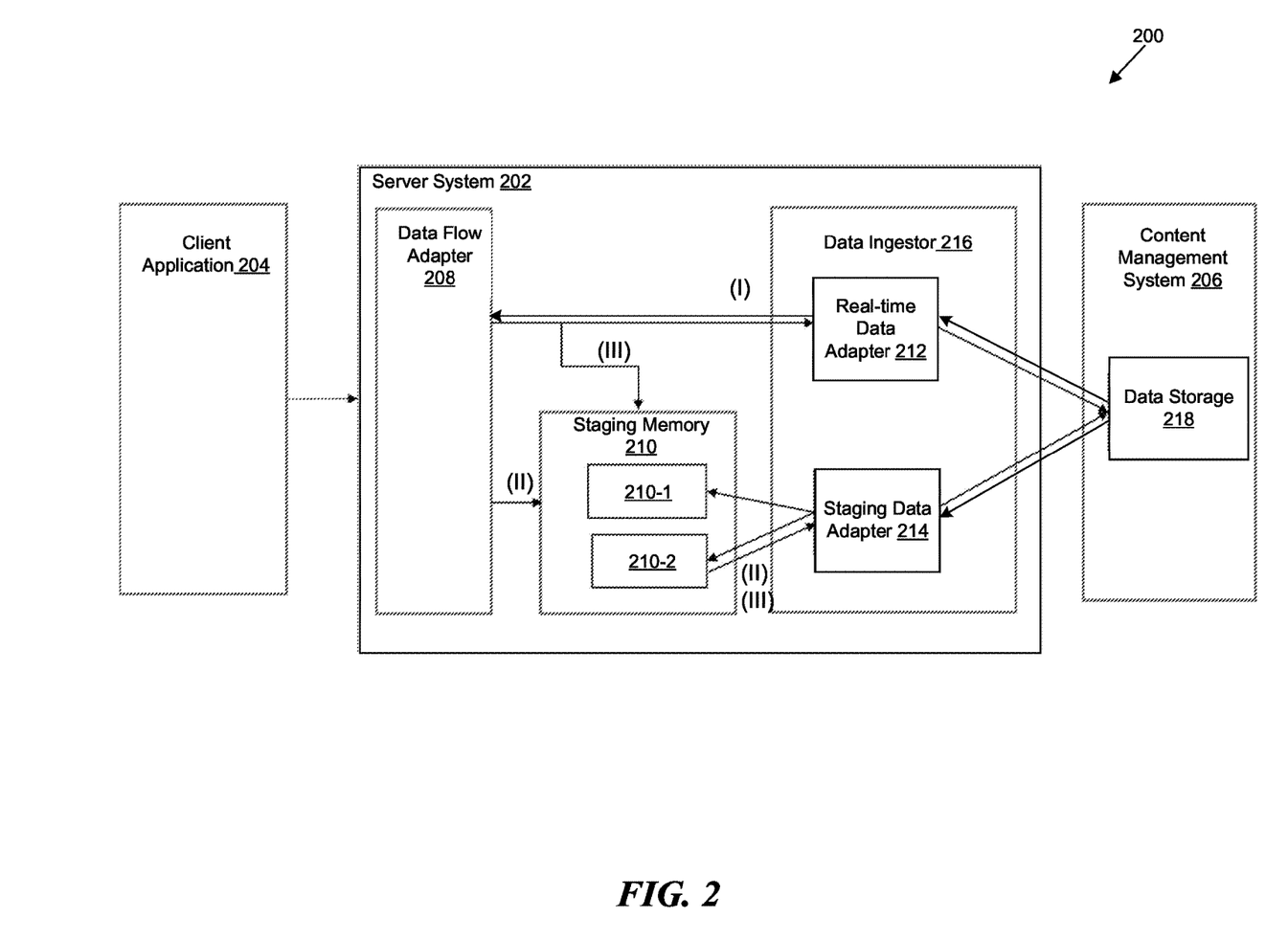
FIG. 2 is a block diagram that illustrates a system for managing electronic content.

FIG. 2 is a block diagram that illustrates a system 200 for managing electronic content. The system 200 includes a server system 202, a client application 204, and a content management system 206 (e.g., a system of record). The server system 202 is in communication with the client application 204 and content management system 206. The server system 202, the client application 204, and the content management system 206 can be distinct and separate from each other. The content management system 206 can correspond to the content management system 108 and the server system 202 can correspond to the manager server 110 described with respect to FIG. 1.

In some implementations, the server system 202 is a server system associated with a wireless service provider. The server system 202 can be configured to receive electronic content, such as electronic documents, from the client application 204 and cause the electronic content to be stored at the content management system 206. In some implementations, the server system 202 includes two or more servers or server units (e.g., server units that are portions of a single server or server system) that are in communication with the client application 204 as well as the content management system 206.

The content management system 206 is configured to store and manage electronic content. The content management system can include multiple servers for storing electronic content. The content management system 206 may further be configured to make the stored electronic content available for retrieval upon a request. The content management system 206 can include one or more databases as well as one or more data storage devices (e.g., collectively referred to herein as a data storage 218). A database refers to an organized collection of structured information. Databases can be configured to store large volumes of data in a single collection thereby making the data readily accessible to move to another location. The databases can thereby support inserting, updating, and deleting data stored thereon. A data storage is a repository for persistently storing and managing collections of data that can include databases as well as simple files. As an example, the data storage 218 can include two databases and a data storage.

In some implementations, the content management system 206 is configured to write (e.g., store) electronic content at the data storage 218 asynchronously. Asynchronous writing refers to running multiple tasks concurrently on a single thread independent from each other. For example, the content management system 206 is configured to write electronic content to the one or more databases and the one or more data storages asynchronously. In an instance that any of the writing operations fail (e.g., due to an interruption in the server operation), the data storage 218 can automatically generate a notification indicating that storing of the electronic content was unsuccessful after all the asynchronous writing operations have been performed. In alternative implementations, the content management system 206 is configured to write electronic content at the data storage 218 synchronously. Synchronous writing refers to running multiple tasks in a sequence. For example, other tasks in the sequence remain idle until the first task in the sequence is completed. In some implementations, asynchronous writing provides a faster way of storing the electronic content compared to synchronous writing but is also more sensitive to operational failures.

In some implementations, the client application 204 is an application operating on the electronic devices 102 and/or 112. The client application 204 enables a user (e.g., a subscriber associated with the system 200) to generate electronic content and communicate the electronic content to the server system 202 to be stored at the content management system 206. In some implementations, the client application 204 is configured to generate electronic content and communicate the electronic content automatically in response to transactions performed by the user via the electronic device 102 or the electronic device 112. For example, the user can do an online purchase or an online service agreement via the client application 204. The client application 204 can be associated with the server system 202. For example, the server system 202 is a wireless network service provider and the client application 204 is an online store application (e.g., a web application or a mobile device application) that allows the user to purchase wireless services and/or products associated with wireless communications from the wireless network provider.

In some examples, the electronic content can include or correspond to an electronic document, an electronic record, an electronic data collection, an electronic communication (e.g., an email or an online discussion), or any other electronic content. The electronic content can include text, graphics, images, audio, and/or video content. In some implementations, the electronic content includes legal content. The electronic document can be a legal document such as a purchase receipt or a service agreement that is generated when the user purchases an item via the client application 204. As further examples, the electronic content includes a financing or a loan agreement, a lease agreement, a contract, or any other legal document.

As shown in FIG. 2, the server system 202 can include a data flow adapter 208, data ingestor 216, and staging memory 210. The data flow adapter 208 can be configured to receive the electronic content from the client application 204 and move the data forward in the system 200 via various paths (e.g., paths I, II, and III in FIG. 2) within the server system 202. For example, path I involves moving electronic content from the data flow adapter 208 to the data ingestor 216 (e.g., a real-time data adapter 212 of the data ingestor 216) while path II involves moving electronic content from the data flow adapter 208 to the staging memory 210 from which the electronic content is then moved to the data ingestor 216 (e.g., a staging data adapter 214). The electronic content can further be moved from the data ingestor 216 to the content management system 206 for storing. Path III is an alternative to path I and is used in instances when the electronic content moved via path I was not successfully stored at the content management system 206. Path III involves moving the electronic content to the staging memory 210 in response to receiving a notification from the data ingestor 216 that the content management system 206 is unable or unavailable to store the electronic content (i.e., an attempted storing of the electronic content at the content management system 206 was not successful).

As shown, the data ingestor 216 includes one or more data adapters (e.g., the real-time data adapter 212 and the staging data adapter 214). A data ingestor adapter, such as the real-time data adapter 212 and staging data adapter 214, is configured to operate as a bridge between the server system 202 and the content management system 206 by facilitating transmission of electronic content between the server system 202 and the content management system 206. For example, the real-time data adapter 212 and staging data adapter 214 can receive electronic content from the data flow adapter 208, process the electronic content, and transmit the processed electronic content to data storage 218 the content management system 206.

Processing the electronic content can include changing the format or size of the electronic content. For example, the electronic content received from the data flow adapter 208 has a first format that is not compatible to be stored by the content management system 206. The real-time data adapter 212 and staging data adapter 214 can convert the format of the electronic content from the first format to a second format prior to moving the electronic content to the data storage 218 of the content management system 206. The second format is compatible with the content management system 206

In some implementations, the real-time data adapter 212 and the staging data adapter 214 are distinct and separate from each other such that they are associated with separate servers or different portions of a server system associated with the data ingestor 216. The real-time data adapter 212 can be configured to allow the electronic content to automatically flow to the data storage 218 without interruptions so that the storing of the electronic content received from the client application 204 occurs within minimal time (e.g., in real-time or nearly in real-time). For example, the real-time data adapter 212 can be configured to automatically forward electronic content to the data storage 218.

The real-time data adapter 212 is also configured to receive notifications from the data storage 218 that indicate whether the data storage 218 has successfully stored the electronic content received from the real-time data adapter.

The notifications can include, for example, a notification indicating that storing of the electronic content was successful and a notification indicating that storing of the electronic content was unsuccessful (e.g., the data storage 218 is unavailable or non-operational). Upon receiving a notification indicating that storing of the electronic content was unsuccessful, the real-time data adapter 212 can forward such indication to the data flow adapter 208.

The staging memory 210 is configured to store electronic content temporarily. The staging memory 210 can receive electronic content from the data flow adapter 208. For example, the staging memory 210 is configured to store the electronic content until the data storage 218 is unable or unavailable for storing the electronic content. After the electronic content is moved to the data storage 218 and successfully stored, the electronic content is no longer stored at the staging memory 210.

In some implementations, moving the electronic content from the data staging memory 210 includes generating a copy of the electronic content. For example, the staging data adapter 214 generates a copy of the electronic content and moves the copy of the electronic content from the data staging memory 210 to the data storage 218. The data staging memory 210 can continue to store the electronic content while the copy of the electronic content is moved from the data staging memory 210 to the data storage 218 by the staging data adapter 214. After the staging data adapter 214 receives an indication that the copy of the electronic content is successfully stored at the data storage 218, the electronic content can be erased from the staging memory 210. In some implementations, the erasing includes erasing a batch of electronic contents from the staging memory 210 periodically (e.g., once a day, once a week, or once a month).

In some implementations, the staging memory 210 includes multiple memories that are distinct and separate from each other. As shown in FIG. 2, the staging memory 210 includes an in-memory storage 210-1 and a persistence storage 210-2. The in-memory storage 210-1 can be configured to store electronic content for a shorter term than the persistence storage 210-2. For example, when an expected time for storing the electronic content at the staging memory 210 is up to a few hours (e.g., 1 hour, 2 hours, or 3 hours), the electronic content can be stored at the in-memory storage 210-1. When the expected time for storing the electronic content at the staging memory 210 is longer than the few hours (e.g., a day), the electronic content can be stored at the persistence storage 210-2. The expected time for storing the electronic content can depend from the excepted time the data storage 218 is unable or unavailable for storing the electronic content. Furthermore, persistence storage 210-2 can be used to store electronic content having a large size. For example, electronic content having a size greater than a threshold size (e.g., 250 KB) can be stored at the persistence storage 210-2. In some examples, the staging memory 210 can be configured to store all content to persistent storage 210-2 or all content to the in-memory storage 210-1. The process of storing electronic content at the in-memory storage 210-1 can be faster and more economical than the process of storing electronic content at the persistence storage 210-2.

The staging data adapter 214 can be configured to receive electronic content from the staging memory 210. In some implementations, the staging data adapter 214 is configured to poll the staging memory 210 to check whether the staging memory 210 includes any electronic content that is stored at the staging memory and is awaiting to be moved to the content management system 206 for storing. Polling by the staging data adapter refers to an operation of actively detecting the status of the staging memory 210. The staging data adapter 214 can also be configured to receive notifications from the data storage 218 that indicate whether the data storage 218 has successfully stored the electronic content from the staging data adapter 214. As described previously, the notifications can include a notification indicating that storing of the electronic content was successful and a notification indicating that storing of the electronic content was unsuccessful. Upon receiving a notification indicating that the storing was unsuccessful, the staging data adapter 214 can be configured to continue to attempt to move the electronic content from the staging memory 210 to the data storage 218 until the data storage is available and able and successfully stores that electronic content.

Content Management Processes

Figure 3:
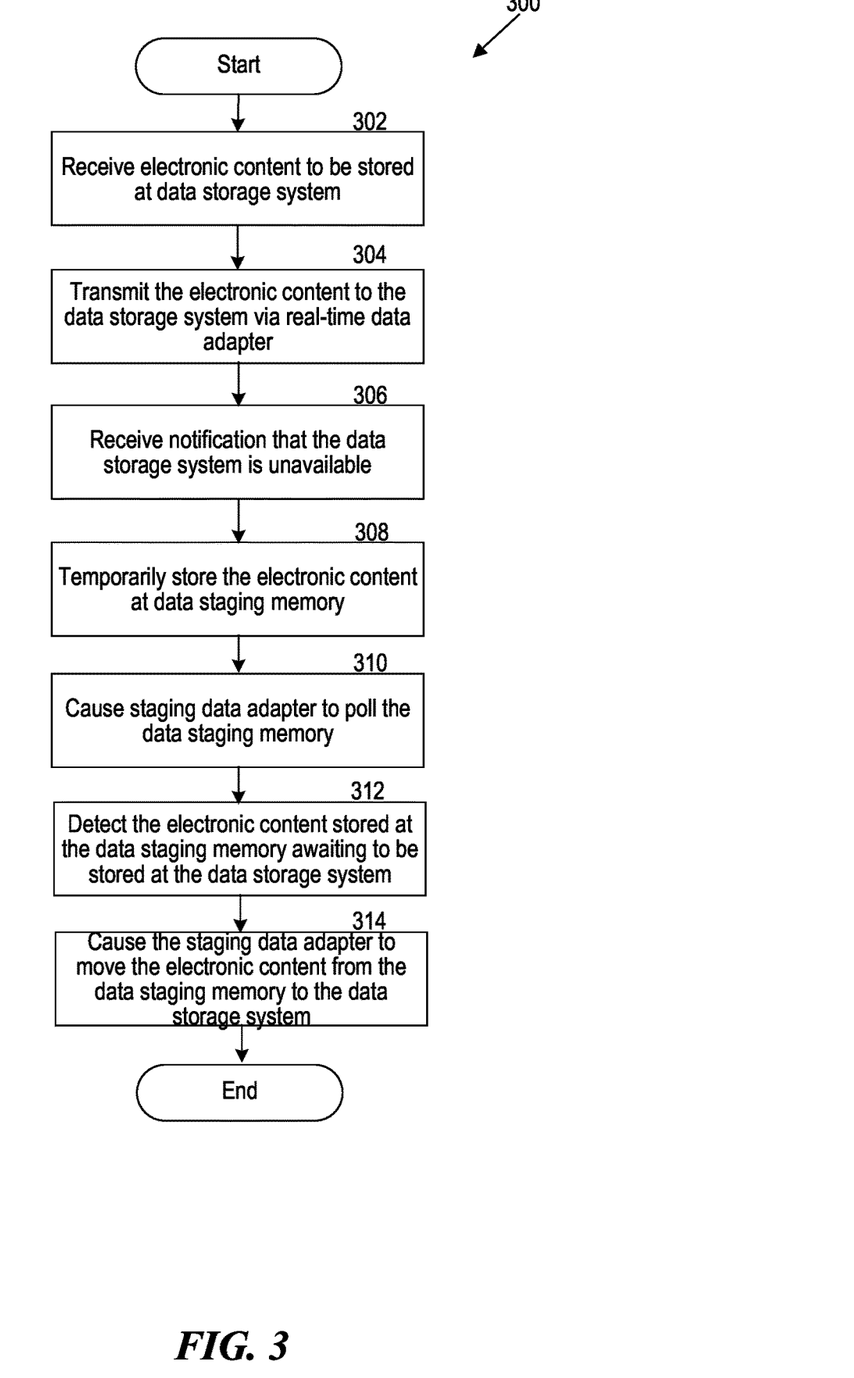
FIG. 3 is a flowchart that illustrates processes for management of electronic content by a content management system.

FIG. 3 is a flowchart that illustrates processes 300 for management of electronic content. The processes 300 can be performed at a server system (e.g., the server system 202 in FIG. 2). The server system (e.g., a first server system) can be in wireless communication with a data storage system (e.g., a second server system such as the content management system 206 in FIG. 2) and a client application (e.g., the client application 204 in FIG. 2). The server system can be associated with a wireless service provider. The server system can include at least one hardware processor and at least one non-transitory memory storing instructions. In one example, the server system includes a computer system 400 described with respect to FIG. 4. When the instructions are executed by the at least one hardware processor, the server system performs the processes 300.

At 302, the server system receives electronic content at a data flow adapter of the server system (e.g., the data flow adapter 208 in FIG. 2). The electronic content is to be stored at a data storage system (e.g., the data storage 218 of the content management system 206 in FIG. 2).

The electronic content can include an electronic document, an electronic record, an electronic data collection, an electronic communication (e.g., an email, a transcription of a voicemail, or an online discussion), or any other electronic content. The electronic content can include text, data collections, graphics, images, audio, and/or video content. In some implementations, the electronic content includes legal content. In one example, the electronic content includes a purchase agreement, a purchase receipt, a financing or loan agreement, a lease agreement, a licensing agreement, a contract, or any other legal document.

In some implementations, the electronic content is communicated to the server system from an application on a client device (e.g., the client application 204 in FIG. 2). The client application can be a mobile device application or a web application running on a mobile device such as a mobile phone, a laptop computer, or a tablet computer (e.g., the electronic device 102 or 112 in FIG. 1) that is in wireless communication with the server system. The electronic content can be generated by the client application. For example, the client application can include an online store application associated with the server system. The client application generates a financing agreement as a user of the client application purchases an item via the client application with a financing plan.

In some implementations, the electronic content indicates a transaction performed by a subscriber associated with the wireless service provider. The transaction can related to purchasing a service or a wireless product from the wireless service provider.

At 304, the server system transmits (e.g., routes) the electronic content from the data flow adapter to the data storage system via a real-time data adapter (e.g., the real-time data adapter 212 via path I in FIG. 2). In some implementations, the real-time data adapter is configured to automatically forward the received electronic content to the data storage system. The real-time data adapter 212 can thereby allow the electronic content to be transmitted from the data flow adapter 208 to the data storage 218 in real-time or in nearly real-time.

In some implementations, the server system can cause the data storage to system asynchronously write the electronic content to the data storage system. For example, the data storage 218 includes one or more databases and one or more data storages. The electronic content can be written to the one or more databases and the one or more data storages asynchronously (e.g., independently of each other).

At 306, the server system receives a first notification indicating that the data storage system is unable or unavailable for storing the electronic content. For example, the first notification is received by the real-time data adapter 212 in FIG. 2 which then forwards the first notification to the data flow adapter 208. The first notification can be an indication that the data storage system is unable or unavailable to store the electronic content (e.g., the data storage 218 failed to perform the asynchronous writing of the electronic content to any of the one or more databased or the one or more data storages of the data storage 218). The unavailability can be caused by server interruptions or that the servers are temporarily too busy to perform additional tasks.

In response to receiving the first notification, at 308 the server system temporarily stores the electronic content at a data staging memory of the server system. For example, in response to receiving the first notification, the data flow adapter 208 transmits the electronic content to the staging memory 210 (e.g., path III in FIG. 2). The electronic content is configured to be stored at the data staging memory while the data storage system remains unable or unavailable to store the electronic content.

In some implementations, the data flow adapter 208 is configured to transmit the electronic content to the staging memory 210 (e.g., path II in FIG. 2) without first transmitting the electronic content to the real-time data adapter 212. Path II of transferring the electronic content from the data flow adapter 208 to the staging memory 210 can be performed independent of path I.

In some implementations, the data staging memory includes an in-memory database and/or a persistent memory database. The electronic content can be temporarily stored at the in-memory database or the persistent memory database until the data storage system is available to store the electronic content. For example, when an expected time for storing the data at the staging memory 210 is up to a few hours (e.g., 1 hour, 2 hours, or 3 hours), the electronic content can be stored at the in-memory storage 210-1. When the expected time for storing the data at the staging memory 210 is longer than the few hours or the electronic content has a large size, the electronic content can be stored at the persistence storage 210-2.

At 310, the server system causes a staging data adapter of the server system (e.g., the staging data adapter 214 in FIG. 2) to poll the data staging memory for at least an indication that electronic content is awaiting at the data staging memory to be stored at the data storage system. The data storage system can be separate and distinct from the data server system. In some implementations, causing the staging data adapter to poll the data staging memory can include causing the staging data adapter to periodically poll an in-memory database or a persistent memory database of the data staging memory (e.g., every 5 minutes, every 10 minutes, every 30 minutes, once in an hour, or once in two hours). For example, a first attempt by the staging data adapter to store the electronic content to the data storage system occurs instantaneously. In an instance that the data storage system is not available to store the electronic content at the first attempt, the staging data adapter continues to attempt to store the electronic content periodically to the data storage system. For example, the staging data adapter 214 sends the staging memory 210 an inquiry to check whether the staging memory 210 includes any electronic content that is awaiting to be stored at the data storage system. The polling can include polling the in-memory storage 210-1 and the persistence storage 210-2 concurrently.

At 312, the server system detects that the electronic content stored at the data staging memory is awaiting to be stored at the data storage system. The detection can include detecting a location of the electronic content awaiting to be stored. For example, the staging data adapter 214 detects that the electronic content is either at the in-memory storage 210-1 or the persistence storage 210-2 of the staging memory 210. Since the staging data adapter 214 can perform the polling periodically, detecting that the staging memory includes any electronic content awaiting to be moved to the data storage 218 can include detecting a batch of electronic content awaiting to be moved. For example, when the staging data adapter 214 performs the polling once in an hour, the batch of electronic content can include all electronic content that has been moved to the staging memory 210 by the data flow adapter 208 during the last hour.

At 314, the server system causes the staging data adapter to move the electronic content from the data staging memory to the data storage system when the data storage system is available and able to store the electronic content. For example, in response to detecting that the staging memory 210 includes electronic content awaiting to be stored at the data storage 218, the staging data adapter 214 moves the electronic content to the data storage 218. Subsequently, when the data storage 218 is operational, the data storage 218 stores the electronic content received from the staging data adapter 214.

In some implementations, subsequent to the electronic content being moved from the data staging memory to the data storage system the server system can receive, by the staging data adapter from the data storage system, a second notification indicating that the data storage system is unable or unavailable to store the electronic content. In response to the second notification, the server system can continue to periodically attempt to move, by the staging data adapter, the electronic content from the data staging memory to the data storage system periodically until the data storage system is available and able to store the electronic content. For example, the staging data adapter 214 repeatably moves the electronic content from the staging memory 210 to the data storage. The moving can be performed, for example, every 10 minutes, every 30 minutes, or every hour. The repeated moving can continue until the staging data adapter 214 receives a notification from the data storage 218 that the electronic content has been successfully stored at the data storage 218.

In alternative implementations, the server system can send an inquiry to the data storage system to check whether the data storage system is available and able to store the electronic content. The server system can send the inquiry periodically until the server system receives an indication that the data storage system is available and able to store the electronic content. For example, the staging data adapter 214 sends an inquiry to the data storage 218 to check whether the data storage 218 is available and able to store electronic content. In response to the inquiry, the data storage 218 sends to the staging data adapter 214 an indication that the data storage 218 either is available and able or is unavailable or unable. Alternatively, the server system can send a command that requests the data storage system to send an indication when the data storage system is available and able to store the electronic content. In response to receiving the indication that the data storage system is available and able to store the electronic content, the staging data adapter moves the electronic content from the staging memory to the data storage system.

In some implementations, the server system can move a batch of electronic content from the data staging memory to the data storage system and cause the batch of electronic content to be stored at the data storage system concurrently. The batch of electronic content can include the electronic content. For example, the batch of the electronic content can include any electronic content stored at the staging memory 210 that has not yet been stored at the data storage 218.

In some implementations, prior to moving the electronic content to the data storage system, the server system can convert the electronic content at the staging data adapter or the real-time data adapter from a first format to a second format. The first format is incompatible with the data storage system and the second format is compatible with the data storage system. For example, the real-time data adapter 212 and the staging data adapter 214 can process the electronic content prior to moving it to the data storage 218. The processing can include changing the format and/or size of the electronic content. For example, changing the format includes changing a text file to a Portable Document Format (PDF). In some implementations, the data flow adapter 208 can process the electronic content received from the client application 204 to change the format and/or size of the electronic content.

In some implementations, the server system generates a copy of the electronic content, for example, by the staging data adapter. The electronic content moved from the data staging memory to the data storage system can be the copy of the electronic content. Subsequent to the copy of the electronic content being moved to the data storage, the server system can erase the electronic content from the data staging memory (e.g., from the in-memory storage 210-1 and/or the persistence storage 210-2). The erasing can be performed periodically (e.g., once a day, once a week, or once a month). The erasing can be performed automatically or in response to an indication that the staging memory includes electronic content that has already been stored at the data storage system. The in-memory storage 210-1 and the persistence storage 210-2 can be erased at different frequencies. For example, the in-memory storage 210-1 is erased once a day while the persistence storage 210-2 is erased once a week.

In some implementations, the processes 300 include receiving electronic content at a first adapter of a first server system (e.g., the data flow adapter 208 of the server system 202 in FIG. 2), The electronic content is to be stored at a second server system (e.g., the content management system 206), The process includes routing the electronic content from the first adapter to a data staging memory (e.g., the staging memory 210) and temporarily storing the electronic content at the data staging memory until the second server system is ready to store the electronic content. The processes 300 include causing a second data adapter of the first server system (e.g., the staging data adapter 214) to poll the data staging memory for at least an indication of electronic content awaiting to be stored at the second server system. The processes also include causing the second data adapter to move the electronic content from the data staging memory to the second server system when the second server system is ready to store the electronic content.

In some implementations, the processes 300 further include attempting to route the electronic content from the first adapter to the second server system via a third data adapter (e.g., the real-time data adapter 212) prior to routing the electronic content from the first adapter to the data staging memory. The third data adapter is configured to automatically forward the received electronic from the first server system to the second server system. The processes 300 include receiving a first notification indicating that the second server system is unable or unavailable for storing the electronic content. The electronic content is transmitted rerouted from the first adapter to the data staging memory in response to the received first notification.

The processes 300 described herein provide an electronic content management system capable of ensuring zero RPO when storing electronic content during operational disruptions. In particular, the various paths (e.g., paths I, II, and III illustrated in FIG. 2) for transmitting the electronic content from a data flow adapter to a content management system ensures that minimum or zero data is lost when the content management system is temporarily interrupted. The processes 300 are useful for storing electronic content that has high importance such as legal documents. In some implementations, the RPO provided by the described processes is less than a threshold RPO pre-defined by, for example, the wireless service provider.

Computer System

Figure 4:
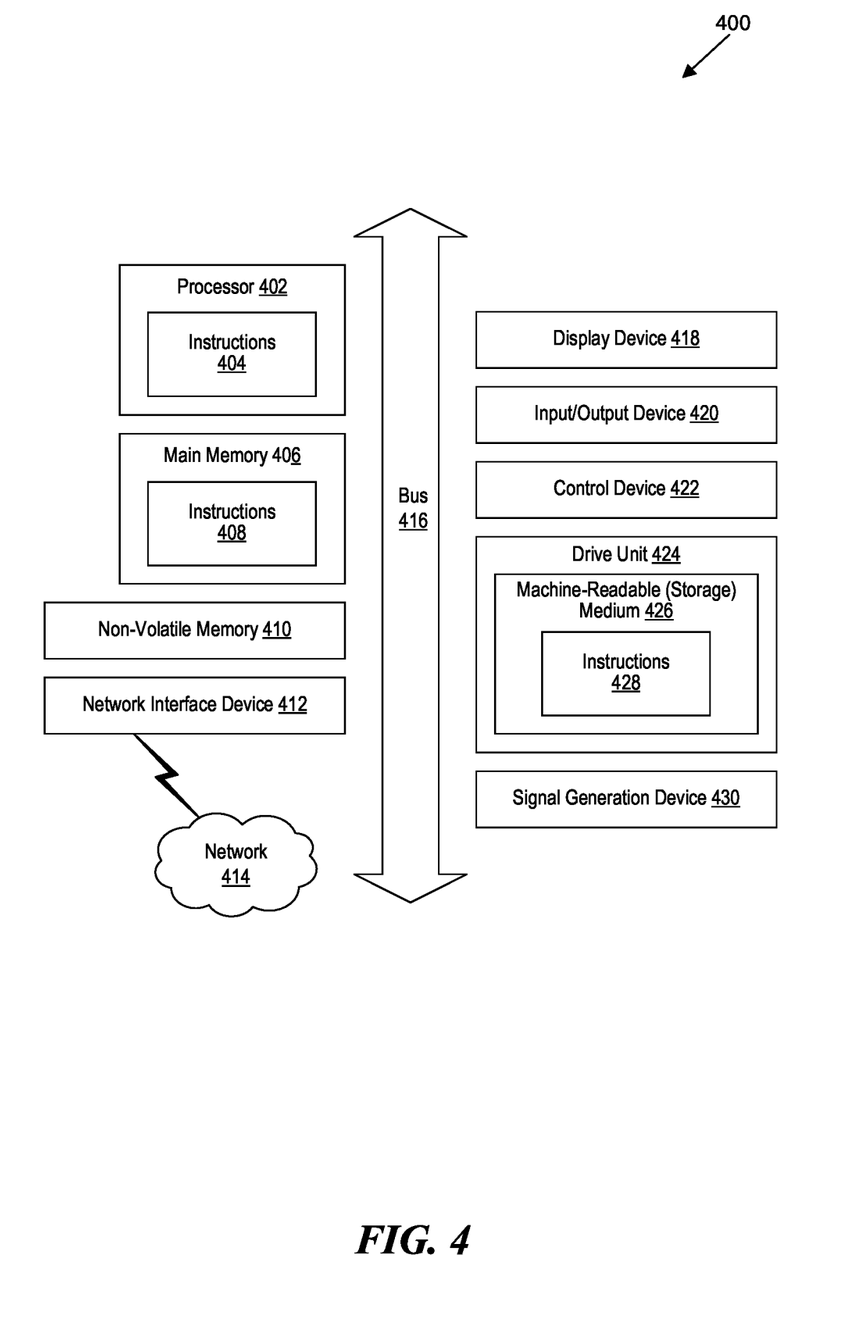
FIG. 4 is a block diagram that illustrates components of a computing device.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A server system associated with a wireless service provider for management of content, the server system comprising:
   at least one hardware processor; and
   at least one non-transitory memory storing instructions, which, when executed by the at least one hardware processor, cause the server system to:
   receive electronic content at a data flow adapter of the server system,
     wherein the electronic content is to be stored at a data storage system;
   transmit the electronic content from the data flow adapter to the data storage system via a real-time data adapter;
     wherein the real-time data adapter is configured to automatically forward the received electronic content to the data storage system;
   receive a first notification indicating that the data storage system is unable or unavailable for storing the electronic content;
   in response to receiving the first notification, temporarily store the electronic content at a data staging memory of the server system,
     wherein the electronic content is stored at the data staging memory while the data storage system remains unable or unavailable to store the electronic content;
   cause a staging data adapter of the server system to poll the data staging memory for at least an indication that electronic content is awaiting at the data staging memory to be stored at the data storage system;
   detect that the electronic content stored at the data staging memory is awaiting to be stored at the data storage system; and
   cause the staging data adapter to move the electronic content from the data staging memory to the data storage system when the data storage system is available and able to store the electronic content.

2. The server system of claim 1, wherein:
   the electronic content indicates a transaction performed by a subscriber associated with the wireless service provider, and the transaction relates to purchasing a service or a wireless product from the wireless service provider.

3. The server system of claim 1, wherein the server system is further caused to:
subsequent to the electronic content being moved from the data staging memory to the data storage system:
receive, by the staging data adapter from the data storage system, a second notification indicating that the data storage system is unable or unavailable to store the electronic content, and
in response to the second notification,
continue to periodically attempt to move, by the staging data adapter, the electronic content from the data staging memory to the data storage system periodically until the data storage system is available and able to store the electronic content.

4. The server system of claim 1, wherein the staging data adapter is caused to:
move a batch of electronic content from the data staging memory to the data storage system, and
cause the batch of electronic content to be stored at the data storage system,
wherein the batch of electronic content includes the electronic content.

5. The server system of claim 1 further caused to:
prior to moving the electronic content to the data storage system,
convert the electronic content at the staging data adapter from a first format to a second format,
wherein the first format is incompatible with the data storage system and the second format is compatible with the data storage system.

6. The server system of claim 1, wherein:
the data staging memory includes:
an in-memory database, and
a persistent memory database; and
the electronic content is temporarily stored at the in-memory database or the persistent memory database until the data storage system is available and able to store the electronic content.

7. The server system of claim 1, wherein:
the data staging memory includes:
an in-memory database, or
a persistent memory database; and
the electronic content is temporarily stored at the in-memory database or the persistent memory database until the data storage system is available and able to store the electronic content.

8. The server system of claim 1, wherein to cause the staging data adapter to poll the data staging memory comprises causing the staging data adapter:
periodically poll an in-memory database or a persistent memory database of the data staging memory.

9. The server system of claim 1 further caused to:
generate a copy of the electronic content by the staging data adapter,
wherein the electronic content moved from the data staging memory to the data storage system is the copy of the electronic content, and
subsequent to the copy of the electronic content being moved to the data storage system, erase the electronic content from the data staging memory.

10. The server system of claim 1 further caused to:
cause the data storage system to asynchronously write the electronic content to the data storage system.

11. The server system of claim 1, wherein the electronic content is communicated to the server system from an application on a client device.

12. A computer-implemented method for management of content, the method comprising:
receiving electronic content at a data flow adapter of a server system,
wherein the electronic content is to be stored at a data storage system;
transmitting the electronic content from the data flow adapter to a data storage system via a real-time data adapter;
wherein the real-time data adapter is configured to automatically forward the received electronic content to the data storage system;
receiving, by the server system, a first notification indicating that the data storage system is unable or unavailable for storing the electronic content;
in response to receiving the first notification, temporarily storing, by the server system, the electronic content at a data staging memory of the server system,
wherein the electronic content is stored at the data staging memory while the data storage system remains unable or unavailable to store the electronic content;
polling, by a staging data adapter of the server system, the data staging memory for at least an indication that electronic content is awaiting at the data staging memory to be stored at the data storage system;
detecting, by the server system, that the electronic content stored at the data staging memory is awaiting to be stored at the data storage system; and
moving, by the staging data adapter, the electronic content from the data staging memory to the data storage system when the data storage system is available and able to store the electronic content.

13. The method of claim 12, wherein:
the electronic content indicates a transaction performed by a subscriber associated with a wireless service provider, and
the transaction relates to purchasing a service or a wireless product from the wireless service provider.

14. The method of claim 12 further including:
subsequent to the electronic content being moved from the data staging memory to the data storage system:
receiving, by the staging data adapter from the data storage system, a second notification indicating that the data storage system is unable or unavailable to store the electronic content, and
in response to the second notification,
continuing to periodically attempt to move, by the staging data adapter, the electronic content from the data staging memory to the data storage system periodically until the data storage system is available and able to store the electronic content.

15. The method of claim 12 further including:
moving, by the server system, a batch of electronic content from the data staging memory to the data storage system, and
storing the batch of electronic content at the data storage system,
wherein the batch of electronic content includes the electronic content.

16. The method of claim 12 further including:
prior to moving the electronic content to the data storage system, converting, by the server system, the electronic content at the staging data adapter from a first format to a second format,
wherein the first format is incompatible with the data storage system and the second format is compatible with the data storage system.

17. At least one non-transitory computer-readable medium storing instructions that, when executed by a processor, cause the processor to:
receive electronic content at a data flow adapter of a server system,
wherein the electronic content is to be stored at a data storage system;
transmit the electronic content from the data flow adapter to a data storage system via a real-time data adapter;
wherein the real-time data adapter is configured to automatically forward the received electronic content to the data storage system;
receive, by the server system, a first notification indicating that the data storage system is unable or unavailable for storing the electronic content;
in response to receiving the first notification, temporarily store, by the server system, the electronic content at a data staging memory of the server system,
wherein the electronic content is stored at the data staging memory while the data storage system remains unable or unavailable to store the electronic content;
poll, by a staging data adapter of the server system, the data staging memory for at least an indication that electronic content is awaiting at the data staging memory to be stored at the data storage system;
detect, by the server system, that the electronic content stored at the data staging memory is awaiting to be stored at the data storage system; and
move, by the staging data adapter, the electronic content from the data staging memory to the data storage system when the data storage system is available and able to store the electronic content.

18. The at least one computer-readable medium of claim 17, wherein:
the electronic content indicates a transaction performed by a subscriber associated with a wireless service provider, and
the transaction relates to purchasing a service or a wireless product from the wireless service provider.

19. The at least one computer-readable medium of claim 17, wherein the processor is further cause to:
subsequent to the electronic content being moved from the data staging memory to the data storage system:
receive, by the staging data adapter from the data storage system, a second notification indicating that the data storage system is unable or unavailable to store the electronic content, and
in response to the second notification,
continue to periodically attempt to move, by the staging data adapter, the electronic content from the data staging memory to the data storage system periodically until the data storage system is available and able to store the electronic content.

20. The at least one computer-readable medium of claim 17, wherein the processor is further cause to:
move, by the server system, a batch of electronic content from the data staging memory to the data storage system, and
store the batch of electronic content at the data storage system,
wherein the batch of electronic content includes the electronic content.

* * * * *